April 30, 1940.　　N. R. SALSKOV-IVERSEN　　2,198,742
METHOD OF AND APPARATUS FOR FORMING AND FEEDING GOBS OF GLASS
Filed Nov. 2, 1936
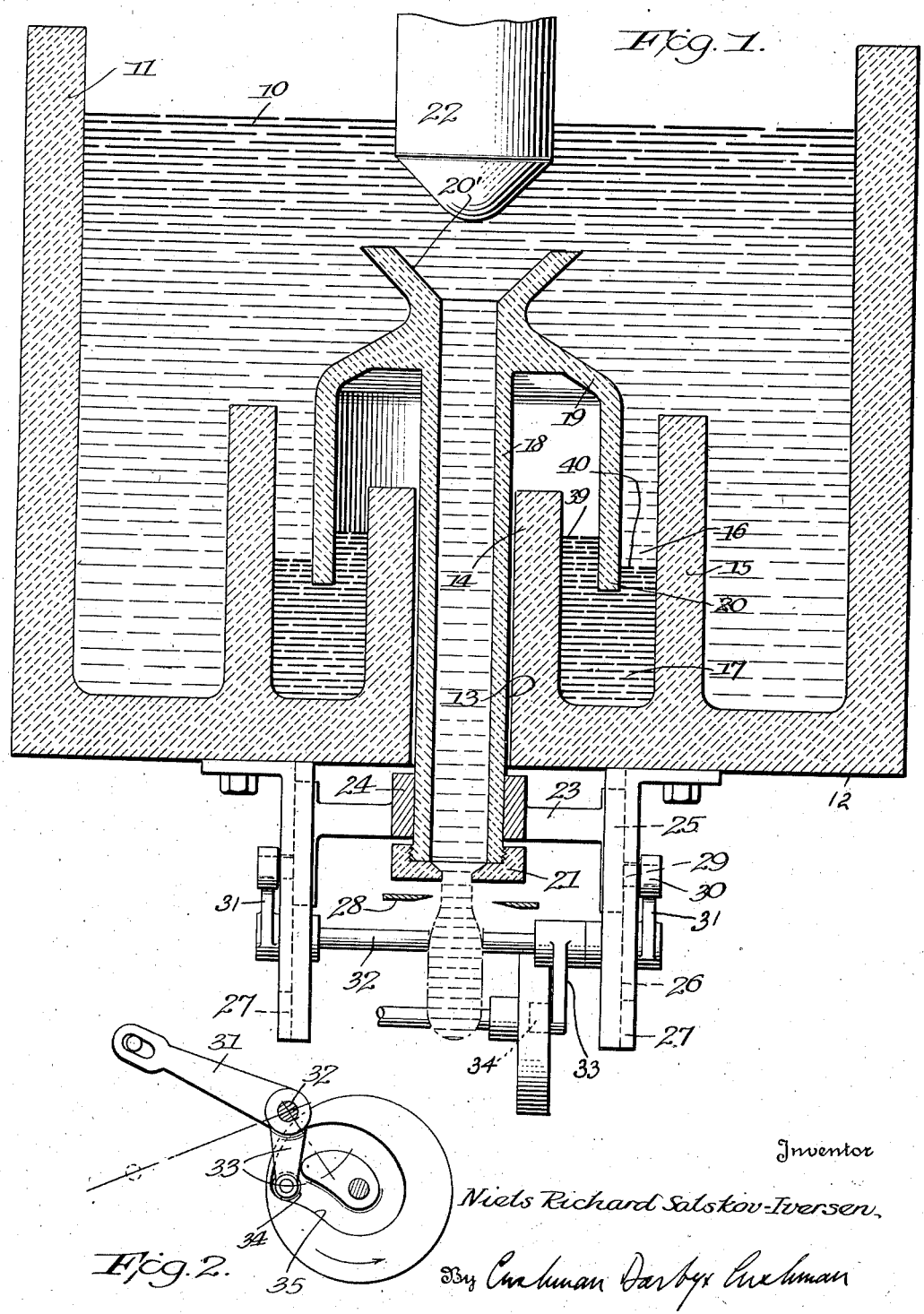
Inventor
Niels Richard Salskov-Iversen
By Cushman Darby Cushman
Attorneys Patented Apr. 30, 1940

2,198,742

UNITED STATES PATENT OFFICE 2,198,742

METHOD OF AND APPARATUS FOR FORMING AND FEEDING GOBS OF GLASS

Niels Richard Salskov-Iversen, Baltimore, Md., assignor to Crown Cork & Seal Company, Inc., Baltimore, Md., a corporation of New York Application November 2, 1936, Serial No. 108,863

11 Claims. (Cl. 49—55)

This invention relates to methods of and means for feeding mold charges of molten glass of predetermined weight and shape from a container, such as a furnace forehearth. The art of gob feeding has been developed along certain lines, but the present invention is a radical departure from standard gob feeding practices, since entirely different principles are utilized.

The theory of operation of commercial gob feeders, as advanced by many persons skilled in the art, is that, as a gob of glass starts to form below the discharge orifice of a feeder, a thin skin of relatively cold glass is formed about the exterior of the incipient gob. Positive means are provided, above the orifice in the forehearth, to accelerate the gravity flow of glass through the orifice into the interior of this skin to prevent attenuation or thinning out of the gob into "tadpole" shape; and this action has been termed "stuffing the gob." According to the same theory, when the flow controlling means above the orifice acts to terminate or reverse the flow, the upper end of the stuffed gob "necks in," and shears are thereupon operated to sever the necked gob. The stub of glass above the orifice is lifted off of the shears and retracted into the discharge orifice to be reheated.

Whether this theory of operation is correct, or whether a gob feeder is considered to operate upon the principle of a simple forceful extrusion of a body of glass, is immaterial, as far as the present invention is concerned. The fact remains that all commercial gob feeders employ some means for positively increasing the pressure on the glass above a stationary orifice in regularly recurring cycles to increase the speed of movement of the glass flowing therethrough during the formation of the gobs.

The present invention, on the contrary, utilizes the inherent inertia factor of the glass, modified by its viscosity and adhesive properties, in the formation of mold charges. Instead of forcing glass through an orifice, means are provided for moving the orifice and a body of glass in a tube above the orifice, downwardly to a predetermined position. Thereupon, means are provided for moving the tube and the orifice upwardly. The glass has an inertia factor, the amount of which is modified by its viscosity, coefficient of friction, and gravity. When the tube is thus moved upwardly, the inertia factor causes the column of glass in the tube to remain relatively stationary so that the lower end of the column is exposed below the orifice. Shears are provided for cutting off this exposed body of glass. As the tube starts downwardly, on its next movement, the inertia of the glass will cause it to lag behind the movement of the tube, so that the sheared stub of glass will be drawn into the interior of the tube. Although this action bears a superficial similarity to the necking in and retraction of the stub in a gob feeder, it is fundamentally different because the column of glass and the stub remain substantially stationary while the refractory tube and the orifice move downwardly with respect to the column, to embrace or enclose the sheared stub. As the downward movement continues, of course, the body of glass in the tube moves downwardly with the tube, due to gravity and the adhesion of the glass with the tube. Upon the next upward movement of the tube, another charge is exposed below the discharge orifice, and the cycle is repeated.

One of the most important features of the feeder of the present invention is the provision of a seal to close the space between the outer wall of the tube and the inner wall of the opening in the floor of the forehearth. Preferably, this seal comprises an outwardly and downwardly flaring skirt or flange associated with the tube having its lower edge immersed in an annular bath of molten metal contained in an annular basin surrounding the opening in the floor of the forehearth. It must be understood, however, that the invention is not limited to a seal of this type. Also, the seal disclosed herein has many other uses than that disclosed in this application.

Means to facilitate the control of the flow of glass may be provided, in the form of a stationary implement or an air column, if the inertia factor is insufficient to overcome the viscosity and adhesive properties of the glass. Moreover, the upper end of the tube may be flared outwardly to assist the inertia factor in overcoming the adhesion of the glass to the inner walls of the tube.

The temperature, composition and consequent viscosity of the glass have an important bearing on the operation of the feeder of the present invention. When the temperature is high and the glass is quite fluid, the adhesive properties of the glass become less pronounced and the inertia factor of the glass is sufficient to effect a discharge of well-formed mold charges below the tube when the latter is drawn upwardly. When relatively cold glass of substantially the viscosity used in commercial gob feeders is employed, however, the viscosity and higher coefficient of friction (adhesive properties) are such that supplemental means are preferably employed to prevent the glass being moved upwardly with the tube when it starts its upward movement. As stated above, an implement or the like may be used for this purpose. Since the effect of the inertia factor bears a definite relation to the viscosity of the glass, it should be understood that, when the viscosity is increased, means may be employed to increase the effect of the inertia factor, whereas when the viscosity is decreased and the fluidity of the glass increased, the inertia factor alone may be sufficient.

Many advantages follow from the use of highly fluid, hot glass in making certain types of glass articles, as distinguished from the "super-viscous" glass to which the operations of a suspended gob feeder are confined. The feeder of the present invention is particularly adapted for feeding mold charges of such highly fluid hot glass, since the mold charge exposed at the lower end of the tube when the latter is quickly moved upwardly may be severed from the parent body and deposited in a mold before sufficient time has elapsed to permit attenuation of the charge.

As an alternative mode of operation, the movable tube or other container having its upper end disposed in the glass and its lower end positioned below the forehearth, may be given short reciprocatory strokes, first of relative speeds in opposite directions such as to facilitate the downward flow of glass therethrough, and then of such relative speeds in opposite direction as to resist the downward flow or to impart an upward flow to the column of glass therein. If the strokes of the first type are continued, it is possible to extrude continuous bodies of glass and, by shaping the discharge opening as desired, and providing cores if necessary, any cross-sectional shape may be imparted to the extruded mass.

The generic principle of the feeder of the present invention comprises first providing a seal enabling a member to be moved through an opening to which glass would otherwise have access; and second, imparting to this member movements of any desired graphical representation of the cycle in relation to time; the relationship between the positive and negative parts of the cycle being such as to either facilitate or retard or arrest the flow of the glass through a discharge opening.

In the accompanying drawing, an illustrative embodiment of the invention is disclosed, but it must be understood that the invention is in no wise limited to the details of construction or the arrangement of parts shown therein and described below, except as required by the appended claims, when given the range of equivalents to which they are entitled in view of the state of the prior art.

In the drawing,

Figure 1 is a vertical sectional view through a forehearth and feeder, certain parts being omitted for the sake of clarity.

Figure 2 is a diagrammatic illustration of one form of mechanical movement for actuating certain parts of the apparatus.

A forehearth 10 is provided with usual side walls 11 and a floor 12, having an opening 13 formed therein. The opening is defined by an upstanding annular wall 14, and in the embodiment illustrated, a second annular wall 15 is spaced outwardly from the former, to provide an annular basin 16 adapted to contain a bath of molten metal 17, such as tin.

A refractory tube 18 extends upwardly through the opening 13 and is provided with an outwardly and downwardly flaring skirt or flange 19 having its lower end 20 immersed in the bath of molten metal in the basin 16. The upper end of the tube 18 may be flanged outwardly as at 20', and the lower end of the tube is preferably provided with a removable orifice ring or bushing 21. Above the tube and projecting into the glass in the forehearth from above, there is provided a stationary refractory implement or plug 22, if desired.

The tube is preferably supported from below by some suitable means for imparting vertical reciprocation thereto, such, for instance, as a cross head 23 having a collar 24 embracing the lower end of the tube. The cross head is provided with slide members 25 reciprocating in grooves 26, in brackets 27 depending from the forehearth. An appropriate shear mechanism represented diagrammatically at 28, is preferably supported by the cross head 23 for movement therewith.

The slide members 25 are provided with outwardly extending trunnions 29 working in slots in the brackets 27, and these trunnions are operatively connected to actuating means 30, which may be in the form of lever arms 31 fixed to a shaft 32 having an actuating arm 33 provided with a roller 34 in engagement with a rotating cam 35.

Instead of confining the molten tin in the space between the two upstanding walls 14, 15, the tin may extend over the entire floor of the forehearth adjacent the feeder, and thus the outer wall 15 may be omitted. By means of the seal provided by the bath of molten metal, the tube 18 can be moved with respect to the forehearth, and leakage of glass through the space between the tube and the orifice is prevented.

In the operation of the device of the present invention, the tube 18 will be filled with glass and a downward movement will be imparted to it and the glass therein by some such actuating means as that shown diagrammatically in Figure 2. When the tube has reached the end of its downward stroke, its motion will be arrested and quickly reversed. Because of the downward momentum imparted to the glass and/or its inherent inertia resulting from its viscosity and adhesive properties, the glass will not immediately be drawn upwardly with the tube, but, on the contrary, the lower end thereof will be exposed by the retraction of the tube. The shears 28 will then be operated to shear the exposed or ejected glass. When the tube starts downwardly on its next cycle, it will tend to overtake the column of glass which has had its movement arrested, with the result that the stub above the shears will be drawn into the tube. Since the shears move downwardly with the tube, they will be moved away from the stub of glass and the effect will be similar to "lifting" the stub from the shears. By withdrawing the stub into the tube, the shear mark is reheated. As the tube continues its downward movement, the glass will start to move with it, and the cycle of operation will be repeated.

In the normal operation of the feeder with fairly viscous glass, the means for moving the tube is preferably constructed so that the upward movement is more rapid than the downward movement. In some cases, however, as when hot, highly fluid glass is used, which flows fairly freely, the tube is preferably given a rapid downward movement and a slow upward one.

Moreover, the speeds of movement of portions of the upward or downward strokes may be different from, and varied in relation to the speeds of movement of other portions, so that a shaping of the mold charges may be accomplished.

The present invention also contemplates many changes in and additions to the mechanical features disclosed in the accompanying drawing and described above.

Although tin is preferred as the metal to be used in the basin 16, any other suitable material may be substituted. The metal should be of a composition that is inert to glass, so that the glass in the forehearth will not be unduly contaminated thereby. Moreover, the metal must be in the fluid state at the temperatures normally employed in glass melting, but it should not boil or become gaseous at that temperature.

The dimensions of the parts serving to provide the molten metal seal must, of course, be so designed, that the molten metal interiorly of the skirt 19 will balance the head of molten metal and the glass supported exteriorly of the skirt. The parts must have sufficient vertical height to permit the required vertical displacement of the molten metal when the tube 18 moves downwardly and the flange 19 is further immersed in the bath. These dimensions can be readily calculated by one skilled in the art and consequently the proportions of parts disclosed in the accompanying drawing are merely illustrative of the principles involved.

As an alternative method of operation, the present invention contemplates providing means for imparting short vibratory reciprocating movements to the tube 18 to assist the flow of glass through the tube. Moreover, a different type of movement may be imparted to the tube to arrest the flow at any desired time, to permit the extruded mass to be sheared in suitable lengths. Any suitable means for imparting the desired vibrating motions may be used.

When a feeder of the present type is used to effect a continuous extrusion of glass, the relationship between the upward or downward strokes should be such as to facilitate and control the flow of glass.

I claim:

1. A gob feeder comprising a refractory tube extending upwardly through an opening in the floor of a forehearth and having its upper end immersed in the glass and its lower end provided with a discharge opening, a seal between the periphery of the tube and the wall of the opening in the floor of the forehearth, means for moving the tube downwardly to a predetermined position with a column of glass substantially filling its interior and for subsequently moving the tube upwardly from said predetermined position to expose a portion of the glass in the tube below the discharge opening, and means for shearing the exposed glass.

2. An apparatus for forming and delivering gobs of glass comprising a forehearth having an opening in its floor, an annular wall surrounding the opening and projecting upwardly into the forehearth from the floor thereof, a bath of molten metal of greater specific gravity than the glass in the forehearth lying on the floor of the forehearth around said wall, a refractory tube extending through said opening and having its upper end disposed in the glass, a skirt connected to the periphery of said tube and spaced outwardly therefrom and having its lower end immersed in said bath of molten metal, thereby sealing the space between the periphery of the tube and the wall of the opening in the floor of the forehearth to prevent the escape of glass through said space, means for reciprocating said tube to provide an intermittent discharge of glass in gob form from the lower end of said tube, and means for shearing the discharged gobs from the parent body in the tube.

3. An apparatus for forming and delivering gobs of glass comprising a forehearth having an opening in its floor, an annular basin surrounding said opening, a bath of molten metal of greater specific gravity than glass contained in said basin, a refractory tube extending through said opening and having its upper end disposed in the glass, a skirt connected to the periphery of said tube and spaced outwardly therefrom and having its lower end immersed in said bath of molten metal, thereby sealing the space between the periphery of the tube and the wall of the opening in the floor of said forehearth from the glass in the forehearth, means for reciprocating said tube to provide an intermittent discharge of glass in gob form from the lower end of said tube, and means for shearing the discharged gobs from the parent body in the tube.

4. An apparatus for feeding gobs of glass comprising a forehearth having an opening in its floor, a refractory tube extending upwardly through said opening and having its upper end in the glass thereabove, sealing means for the space between the tube and the wall of the opening to prevent the escape of glass through said space, supporting means for the tube below the floor of the forehearth, means for moving the supporting means, the tube, and a column of glass contained therein downwardly to a predetermined position and for thereafter moving the tube upwardly at such a rate as to expose the lower portion of the column of glass so moved downwardly, and means for shearing the exposed glass.

5. An apparatus for delivering glass comprising a forehearth having an opening in its floor, an annular wall surrounding the opening and projecting upwardly, a bath of molten metal of greater specific gravity than the glass in the forehearth surrounding said wall, a refractory tube extending through the opening and having its upper end disposed in the glass, a skirt connected to the periphery of said tube and spaced outwardly therefrom and having its lower end immersed in said bath of molten metal, thereby sealing the space between the periphery of the tube and the wall of the opening in the floor of the forehearth to prevent the escape of glass through said space, and means for moving said tube to control the discharge of glass from the lower end of the tube.

6. An apparatus of the class described comprising a container for a body of molten glass, an opening in a wall of said container positioned below the normal glass level therein, a movably mounted refractory implement extending through the opening in spaced relation to the walls thereof from a point disposed exteriorly of the container to a point inside thereof in contact with the glass, and flexible sealing means for sealing the space between the implement and the wall of the opening, so as to permit free movement of the implement relative to said walls while preventing the flow of glass through said space.

7. Means for sealing an opening in a container for molten glass, comprising a wall surrounding said opening and extending upwardly in the glass, a body of molten material in the container of greater specific gravity than the glass and surrounding said wall, an implement extending upwardly through the opening into the glass in the container and having an outwardly flaring and downwardly extending skirt overlying said wall and having its lower end immersed in said body of molten material, thereby sealing the space between the wall of the opening and the implement.

8. The method of delivering gobs of molten glass from a forehearth, which comprises segregating, from the parent body of glass in the forehearth, an elongated cylindrical column of glass extending from a point within the forehearth continuously to a point below the floor thereof, imparting to the cylindrical wall of the column a frictional force in a downward direction, thereby moving the column downwardly and imparting a momentum factor thereto, terminating the downward frictional force and projecting and exposing the lower end of said column by a continuation of said momentum factor, and shearing a gob of glass from the exposed end of the column.

9. The method of delivering gobs of molten glass from a forehearth, which comprises segregating, from the parent body of glass in the forehearth, an elongated cylindrical column of glass extending from a point within the forehearth continuously to a point below the floor thereof, imparting to the cylindrical wall of the column a frictional force in a downward direction, thereby moving the column downwardly and imparting a momentum factor thereto, terminating the downward frictional force, continuing the downward movement of the column by said momentum factor alone, imparting to the cylindrical surface of the column a frictional force in an upward direction to arrest the downward movement of the glass, and shearing a gob of glass from the lower end of the arrested column.

10. The method of delivering gobs of molten glass from a forehearth, which comprises segregating, from the parent body of glass in the forehearth, an elongated cylindrical column of glass extending from a point within the forehearth continuously to a point below the floor thereof, imparting to the cylindrical wall of the column a frictional force in a downward direction, thereby moving the column downwardly and imparting a momentum factor thereto, terminating the downward frictional force, continuing the downward movement of the glass under the influence of said momentum factor, imparting to the cylindrical surface of the column a frictional fore in an upward direction to arrest the downward movement, shearing a gob of glass from the lower end of the column, and continuing the upward frictional force to impart an upward momentum factor to the remaining portion of the column of glass.

11. The method of delivering gobs of molten glass from a forehearth, which comprises segregating, from the parent body in the forehearth, an elongated cylindrical column of glass in a vertically disposed refractory tube extending from a point within the forehearth continuously to a point below the floor thereof, moving the tube downwardly to impart to the cylindrical wall of the column a frictional force in a downward direction, thereby moving the column downwardly and imparting a momentum factor thereto, moving the tube upwardly while said momentum factor continues to move the glass downwardly to project the lower end of the column downwardly below the lower end of the tube and thereby imparting to the cylindrical wall of the column a frictional force in an upward direction to counteract said downward momentum factor, and shearing a gob of glass from the lower end of the column, projected downwardly below the lower end of the tube.

NIELS RICHARD SALSKOV-IVERSEN.